US 8,645,416 B2

(12) United States Patent
Rose et al.

(10) Patent No.: US 8,645,416 B2
(45) Date of Patent: Feb. 4, 2014

(54) SEARCHING CONTENT IN DISTRIBUTED COMPUTING NETWORKS

(75) Inventors: Anthony Rose, London (GB); Kevin Bermeister, Vaucluse (AU)

(73) Assignee: Brilliant Digital Entertainment, Inc., Studio City, CA (US)

(*) Notice: Subject to any disclaimer, the term of this patent is extended or adjusted under 35 U.S.C. 154(b) by 0 days.

(21) Appl. No.: 13/314,518

(22) Filed: Dec. 8, 2011

(65) Prior Publication Data
US 2012/0089585 A1    Apr. 12, 2012

Related U.S. Application Data

(62) Division of application No. 10/866,170, filed on Jun. 12, 2004, now Pat. No. 8,095,500.

(60) Provisional application No. 60/478,523, filed on Jun. 13, 2003.

(51) Int. Cl.
G06F 17/30 (2006.01)

(52) U.S. Cl.
USPC ........................................................ 707/770

(58) Field of Classification Search
USPC .................................. 707/2, 3, 770; 709/238
See application file for complete search history.

(56) References Cited

U.S. PATENT DOCUMENTS

| 5,371,852 A | 12/1994 | Attanasio et al. |
| 5,590,056 A | 12/1996 | Barritz |
| 5,734,838 A | 3/1998 | Robinson et al. |
| 5,737,526 A | 4/1998 | Periasamy et al. |
| 5,774,870 A | 6/1998 | Storey |
| 5,781,736 A | 7/1998 | Schmidt |
| 5,819,047 A | 10/1998 | Bauer et al. |
| 5,845,091 A | 12/1998 | Dunne et al. |
| 5,903,874 A | 5/1999 | Leonard et al. |
| 5,926,808 A | 7/1999 | Evans et al. |
| 5,937,391 A | 8/1999 | Ikeda et al. |
| 5,943,480 A | 8/1999 | Neidhardt |
| 5,963,916 A | 10/1999 | Kaplan |
| 5,978,791 A | 11/1999 | Farber et al. |
| 6,009,411 A | 12/1999 | Kepecs |
| 6,009,412 A | 12/1999 | Storey |
| 6,041,343 A | 3/2000 | Nguyen et al. |
| 6,061,660 A | 5/2000 | Eggleston et al. |
| 6,076,069 A | 6/2000 | Laor |

(Continued)

FOREIGN PATENT DOCUMENTS

WO    WO 20040088947    10/2004

OTHER PUBLICATIONS

Wang et al., "Ticket-based service access scheme for mobile users," Australian Computer Science Communications archive, vol. 24, Issue 1 (Jan.-Feb. 2002) pp. 285-292.

Primary Examiner — Etienne Leroux
(74) Attorney, Agent, or Firm — Siritzky Law, PLLC; Brian Siritzky

(57) ABSTRACT

A distributed search system includes a central server having an index of data, wherein the index of data is also available on a plurality of computing devices in a distributed computing network, the plurality of computing devices being distinct from the central server, each the computing device having a cache in which the computing device automatically stores data generated during the course of the computing device's access to another computing network distinct from the distributed computing network.

20 Claims, 6 Drawing Sheets

(56) References Cited

U.S. PATENT DOCUMENTS

| | | |
|---|---|---|
| 6,076,101 A | 6/2000 | Kamakura et al. |
| 6,085,253 A | 7/2000 | Blackwell et al. |
| 6,138,911 A | 10/2000 | Fredregill et al. |
| 6,178,408 B1 | 1/2001 | Copple et al. |
| 6,212,545 B1 | 4/2001 | Ohtani et al. |
| 6,222,841 B1 | 4/2001 | Taniguchi |
| 6,230,204 B1 | 5/2001 | Fleming |
| 6,275,820 B1 | 8/2001 | Navin-Chandra et al. |
| 6,282,522 B1 | 8/2001 | Davis et al. |
| 6,308,208 B1 | 10/2001 | Jung et al. |
| 6,330,543 B1 | 12/2001 | Kepecs |
| 6,339,765 B1 | 1/2002 | Maher |
| 6,343,990 B1 | 2/2002 | Rasmussen et al. |
| 6,370,527 B1 | 4/2002 | Singhal |
| 6,378,075 B1 | 4/2002 | Goldstein et al. |
| 6,415,280 B1 | 7/2002 | Farber et al. |
| 6,434,548 B1 | 8/2002 | Emens et al. |
| 6,460,086 B1 | 10/2002 | Swaminathan et al. |
| 6,467,685 B1 | 10/2002 | Teicher |
| 6,490,575 B1 | 12/2002 | Berstis |
| 6,490,579 B1 | 12/2002 | Gao et al. |
| 6,493,341 B1 | 12/2002 | Datta et al. |
| 6,501,760 B1 | 12/2002 | Ohba et al. |
| 6,505,237 B2 | 1/2003 | Beyda et al. |
| 6,516,350 B1 | 2/2003 | Lumelsky et al. |
| 6,523,023 B1 | 2/2003 | Sonnenberg |
| 6,571,216 B1 | 5/2003 | Garg et al. |
| 6,578,012 B1 | 6/2003 | Storey |
| 6,636,854 B2 | 10/2003 | Dutta et al. |
| 6,721,847 B2 | 4/2004 | Hursey |
| 6,772,214 B1 | 8/2004 | McClain et al. |
| 6,816,850 B2 | 11/2004 | Culiss |
| 6,871,232 B2 | 3/2005 | Curie et al. |
| 6,915,333 B2 | 7/2005 | Delia et al. |
| 6,928,442 B2 | 8/2005 | Farber et al. |
| 6,965,968 B1 | 11/2005 | Touboul |
| 6,970,908 B1 | 11/2005 | Larky et al. |
| 7,124,101 B1 | 10/2006 | Mikurak |
| 7,263,528 B2 | 8/2007 | Haff et al. |
| 7,266,684 B2 | 9/2007 | Jancula |
| 7,269,577 B2 | 9/2007 | Stefik et al. |
| 7,555,749 B2 | 6/2009 | Wickham et al. |
| 7,627,603 B2 | 12/2009 | Rosenblum et al. |
| 2001/0047275 A1 | 11/2001 | Terretta |
| 2002/0007350 A1 | 1/2002 | Yen |
| 2002/0007404 A1 | 1/2002 | Vange et al. |
| 2002/0023220 A1 | 2/2002 | Kaplan |
| 2002/0026423 A1 | 2/2002 | Maritzen et al. |
| 2002/0052885 A1 | 5/2002 | Levy |
| 2002/0073075 A1* | 6/2002 | Dutta et al. ............... 707/3 |
| 2002/0156917 A1* | 10/2002 | Nye .......................... 709/238 |
| 2002/0169854 A1 | 11/2002 | Tarnoff |
| 2003/0050959 A1 | 3/2003 | Faybishenko et al. |
| 2003/0050980 A1 | 3/2003 | Dutta et al. |
| 2003/0093695 A1 | 5/2003 | Dutta |
| 2003/0105812 A1 | 6/2003 | Flowers et al. |
| 2003/0110391 A1 | 6/2003 | Wolff et al. |
| 2003/0120593 A1 | 6/2003 | Bansal et al. |
| 2003/0120734 A1 | 6/2003 | Kagan et al. |
| 2003/0120952 A1 | 6/2003 | Tarbotton et al. |
| 2003/0126122 A1 | 7/2003 | Bosley et al. |
| 2003/0131098 A1 | 7/2003 | Huntington et al. |
| 2003/0191737 A1 | 10/2003 | Steele et al. |
| 2003/0191752 A1 | 10/2003 | Fairweather |
| 2003/0208406 A1 | 11/2003 | Okamoto et al. |
| 2003/0208621 A1 | 11/2003 | Bowman |
| 2004/0010543 A1 | 1/2004 | Grobman |
| 2004/0024719 A1 | 2/2004 | Adar et al. |
| 2004/0044790 A1 | 3/2004 | Loach et al. |
| 2004/0073908 A1 | 4/2004 | Benejam et al. |
| 2004/0088576 A1 | 5/2004 | Foster et al. |
| 2004/0122947 A1 | 6/2004 | Banerjee et al. |
| 2004/0122958 A1 | 6/2004 | Wardrop |
| 2004/0133640 A1 | 7/2004 | Yeager et al. |
| 2004/0148434 A1 | 7/2004 | Matsubara et al. |
| 2004/0199667 A1 | 10/2004 | Dobbins |
| 2004/0255140 A1 | 12/2004 | Margolus et al. |
| 2005/0015466 A1 | 1/2005 | Tripp |
| 2005/0076082 A1 | 4/2005 | Le Pennec et al. |
| 2005/0076087 A1 | 4/2005 | Budd et al. |
| 2005/0080846 A1 | 4/2005 | McCleskey et al. |
| 2005/0080858 A1 | 4/2005 | Pessach |
| 2006/0015366 A1 | 1/2006 | Shuster |
| 2006/0031309 A1 | 2/2006 | Luoffo et al. |
| 2007/0067836 A1 | 3/2007 | Busboom et al. |
| 2007/0162300 A1 | 7/2007 | Roever et al. |
| 2007/0283423 A1 | 12/2007 | Bradley et al. |

* cited by examiner

SEARCHING CONTENT IN DISTRIBUTED COMPUTING NETWORKS

CROSS-REFERENCE TO RELATED APPLICATIONS

The present invention is a divisional of U.S. patent application Ser. No. 10/866,170, filed Jun. 12, 2004, titled "Methods and systems for searching content in distributed computing networks," published Mar. 3, 2005 as U.S. Publication No. 20050050028, the entire contents of which are fully incorporated herein for all purposes; U.S. patent application Ser. No. 10/866,170, claims priority to U.S. Provisional Application No. 60/478,523 entitled "Methods and Systems for Operating, Monitoring, and Integrating Computing Networks" and filed on Jun. 13, 2003 for priority purposes.

FIELD OF THE INVENTION

The present invention is generally related to the field of distributed computing networks and, more specifically, to improved methods and systems for searching content in a distributed computing network.

BACKGROUND OF THE INVENTION

Search engines on the Internet are used by people all over the world to find and download text, video, images, audio, and other information, collectively referred to as data. Typically, search engines periodically examine the data objects contained on many servers connected to the Internet. The search engines then construct an index of each server's contents and creates a link for the server locations corresponding to contents.

Most commercial Internet search engines contain a search engine application, residing in a central-server complex. This central server complex receives search requests throughout the day from Internet users globally. However, when the number of search requests per day is too large, this approach can prove disadvantageous.

For example, for handling a situation where the number of search requests per day is close to a 100 million, a heavy central server infrastructure is required, both in terms of the size of the central server complex and magnitude of incoming bandwidth. Furthermore, the number of search requests per day peaks during certain times of the day to extremely high values, which makes load-balancing an important consideration.

Another typical approach to searching content is by using a distributed search system, which is employed to search content in certain distributed computing networks such as peer-to-peer networks ("P2P networks"). In such a system, there is no central server, or central bank of servers, that receives all search requests, conducts the search, and responds with search results. Rather, the database of searchable content, available as shared files in the network, is indexed and the index is distributed to the clients in the network, or nodes regionally distributed throughout the network. Updates or changes in the available file information in each client are periodically uploaded to the clients, or the regional nodes, in the network, via a peer-to-peer client application. As a result, search requests can be widely distributed, with each search engine responding to a subset of search queries. To retrieve search results, a client receives a search input from a user, locates a copy of the content database or content index locally or on a regional node, finds the entry associated with the search input, and generates a search response of available file information in the entire network.

This distributed search system requires a simpler server infrastructure than the central server approach and, thus, is capable of sustaining a larger number of search requests per day for a lower operational cost. Conventionally, however, distributed searching has been applied to files that are specifically designated as being part of a distributed search network. For example, in a typical distributed network, files that are indexed, and therefore capable of being distributed to other client devices, are located in specially designated folder, i.e. a "shared folder". Once placed in the specially designated folder, file identifying information, such as name, file size, hash value, author, owner, and other data, is extracted and incorporated into a central index that is stored either in a local index or index located on a regional node. These conventional systems only operate on those files that are specifically designated as being derived from the distributed network or specifically designated as being part of the distributed network.

Additionally, users often want to search and obtain content from various sources. Conventionally, users have to go to multiple search indices, input the search request, and, if the file is available, access the content file from that source. Most of the conventional search engines have a central-server based search system, i.e., all search requests are sent to a server complex, which performs a search on a central database. The search results in this case do not include content from specific P2P networks. Search in a P2P network uses a completely different approach: the entire search database is distributed to every client participating in the P2P network, and each client performs searches on their local copy of the database. However, the search results do not include content outside the P2P network.

The art fails to disclose distributed search systems that take advantage of searches conducted by users on conventional centralized server search systems to build a distributed search index. What is needed, therefore, is an improved distributed network search system that takes advantage of the millions of searches conducted by users on central server search systems to construct an index of data. What is also needed is a method and system for capturing web pages and other data accessed by an individual, indexing that data, and making that indexed data available to other distributed network users.

Further, the art fails to disclose methods and systems for being able to search, via a single site or application, content from the Internet as well as specific distributed computing (P2P) networks. What is needed, therefore, is a search system with the capability to integrate search results from distributed computing networks and those from central server search systems and present those search results to the user via a single interface.

SUMMARY OF THE INVENTION

The present invention discloses an improved method and system for indexing and searching content in a distributed computing network. The present invention also enables users to search for content on a distributed computing network, as well as on the web, via a unified interface. In one embodiment, the present invention is directed toward a method for searching content on a distributed computing network having an index of available data. The method comprises scanning cached network files in a computer that is in data communication with a network wherein said network files are generated in the course of a user's access of public or private communication networks, indexing or scanning the cached network files to generate index data, and supplying index data to the index of available data on the distributed computing network.

Separately and optionally, the method further comprises the step of searching said index of available data on the distributed computing network in response to a search request sent by a user connected to said distributed computing network and sending a search response to the user. Preferably, the index data includes identification information indicative of a location of said available data, such as a peer computer participating in said distributed computing network, or identification information indicative of an original source of said available data, such as a content providing server host or web site.

To avoid violating the privacy of users, preferably the method of indexing cached network files includes the step of ignoring personal identification information of a user or deleting personal identification information of a user. To make accessing data more efficient, it is also preferable to index cached network files by grouping index information of files according to source. Optionally, search results are protected and the step of sending the search response to the user is accompanied by requesting the user to present credentials before access to search responses is allowed.

The present invention is also directed toward computer program codes, distributed search systems, and distributed searching methods that employ the processes discussed above. Specifically, the present invention includes a distributed search system with a central server having an index of data wherein the index of data is generated by a plurality of computing devices scanning cached network files and wherein the network files are generated in the course of a user's access of public or private communication networks, indexing the cached network files to generate index data, and transmitting the index data to the central server. The distributed search system also includes a plurality of first clients connected to a distributed computing network, wherein each of the first clients has a locally or remotely stored copy of part or all of the data index and a plurality of second clients connected to the distributed computing network, wherein one or more of the first clients receive a plurality of search requests from at least one of the second clients, and fulfill the requests by searching the copy of the data index.

The present invention is also directed toward a computer program product for generating an index of available data on a distributed computing network. The computer program product comprises computer readable program code for scanning cached network files in a computer that is in data communication with a network wherein the network files are generated in the course of a user's access of at least one public or private communication networks, computer readable program code for indexing the cached network files to generate index data, and computer readable program code for supplying index data to the index of available data on the distributed computing network.

The present invention also enables each client to store only a small part of the total available index and the means to allow the client computer that is performing the search to determine which search engine client or clients to contact for that particular search. For instance, some search clients may contain an index of all data items that contain the word "car", or all images in a certain format, or any other describable subset of the total search index.

BRIEF DESCRIPTION OF THE DRAWINGS

These and other features and advantages of the present invention will be further appreciated, as they become better understood by reference to the detailed description when considered in connection with the accompanying drawings.

DETAILED DESCRIPTION OF THE INVENTION

The present invention discloses an improved method and system for indexing and searching content in a distributed computing network. The present invention also enables users to search for content on a distributed computing network, as well as on the World Wide Web (hereafter referred to simply as "web"), via a unified interface. Various modifications to the preferred embodiment will be readily apparent to those of ordinary skill in the art, and the disclosure set forth herein may be applicable to other embodiments and applications without departing from the spirit and scope of the present invention and the claims appended hereto. Thus, the present invention is not intended to be limited to the embodiments described, but is to be accorded the broadest scope consistent with the disclosure set forth herein.

As used herein, the term computing devices broadly encompasses any type of computing device that could be placed in data communication with a network. For example, the computing device could be any one of a personal computer, laptop, personal data assistant, mobile phone, wireless email manager, media player, computing tablet, set-top box, networked DVD player, or other type of network access device. Each of said devices has a processor, memory, and a communication interface, such as a modem or Ethernet port. Similarly, the term network broadly encompasses any type of network, including local area networks, wide area networks, metropolitan area networks, and wireless networks based on infrared, bluetooth, wide area data, cellular telephony, WLAN, paging, or satellite technology.

Figure 1:
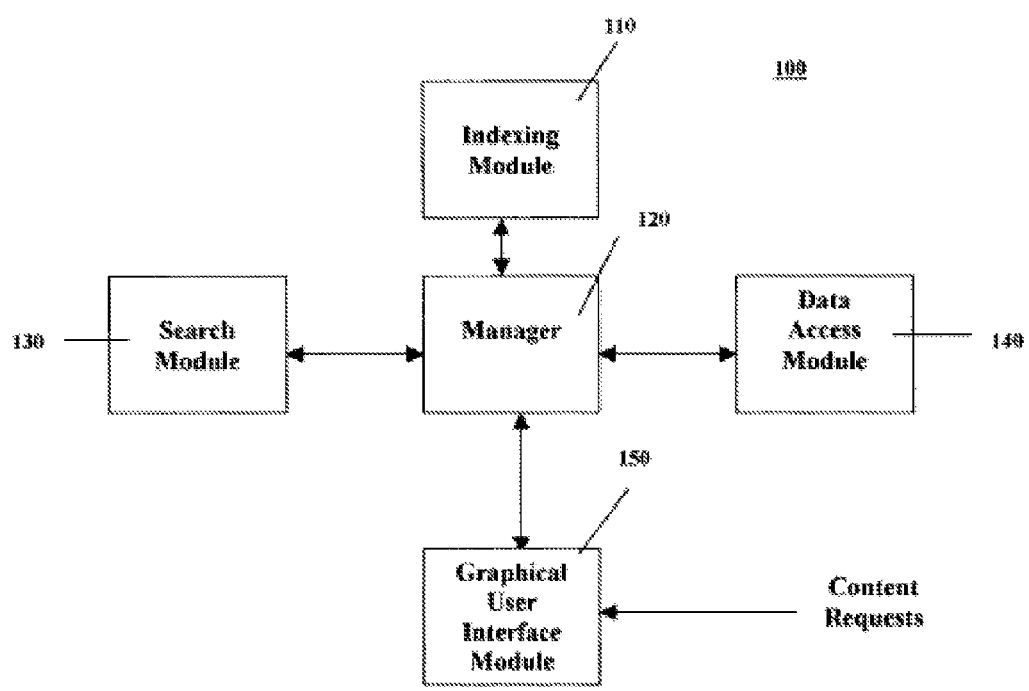
FIG. 1 is a block diagram illustrating the main system components of the present invention.

Referring to FIG. 1, a preferred embodiment of the system of the present invention 100 is shown. Application software 100 is designed to be operational on a computing device and receive search requests from a user. One of ordinary skill in the art would appreciate that the program 100 can be installed on any computing device and be compatible with any operating system, including Java-based or Microsoft-based operating systems. One of ordinary skill in the art would also appreciate that the program 100 interfaces with the operating system of a computing device to communicate with processors, peripherals, data transmission, data reception, display and other hardware elements. The program preferably comprises a graphical user interface module 150, an indexing module 110, a data access module 140, a search module 130, and a manager 120. One of ordinary skill in the art would appreciate that some or all of the aforementioned components can be integrated into another software program, such as an existing peer-to-peer application, operating system, media player, or browser.

The Indexing Module 110 is designed to periodically search a plurality of folder(s) on a user's computing device to identify cached versions of data having network addresses associated thereto. One of ordinary skill in the art would appreciate that browsing applications, whether used for accessing the Internet or any public or private network, cache images, text, and other data in a file stored locally on the computing device. The cached data permits the computing device to rapidly reproduce and present data when accessed again by a user without requiring that data to be downloaded again.

In a first embodiment, the Indexing Module 110 searches all files on a computing device to identify cached data files that have a network address associated thereto. In a second embodiment, the Indexing Module 110 searches all files in specially designated folders on a computing device to identify data files that have a network address associated thereto. In a preferred embodiment, the Indexing Module searches cached versions of data by accessing a designated Internet Cache folder located on the computer's hard drive. The process of extracting data and network address information from a file is known in the art.

The Indexing Module 110 periodically scans the plurality of files, identifies files that have not been indexed or catalogued, extracts identifying information from the files, extracts network address information from the files, and generates an index. One of ordinary skill in the art would appreciate that the extracted information could be any information in the file, including words, images, links, source, or other information. In another embodiment, the Indexing Module 110 interfaces with the search index of a P2P network (not shown) to integrate the indexed cached data into a larger local or regional P2P search index. This allows the individual user's index files to become a part of the global distributed index.

The manager 120 represents a class of applications used by computers to enable users to share files located on their own hard drives as well as to search and download files from other computers over a distributed computing network. Optionally, apart from managing indexing and content-uploading functions, and searching for and downloading content over P2P networks, the manager can also interface with other applications, such as applications for awarding points for buying content and for file and/or CPU time sharing, for tracking of points accumulated by users and for redemption of points for items of merchandise. Manager 120 coordinates the functions of indexing module 110, data access module 140, searching module 130 and GUI 150.

The search module 130 receives search requests from a manager 120 and transmits those requests to other computers participating in the distributed computing network and subsequently returning search results for display.

The data access module 140 enables the actual download of data over the distributed network once the user receives the search results and selects data to access. The data access module 140 is used to identify available computers in the distributed computing network from which files, documents, web pages, etc., can be downloaded, manage the establishment of connections to these computers and to manage the download of data.

In order to make the search and download of data from a distributed computing network convenient and user friendly, a Graphical User Interface ("GUI") 150 may be provided, or this task can be fulfilled using a commonly available Internet browser or other search or browsing interface. The functions of GUI 150 include receiving content requests from users and providing a download progress display that helps users keep track when downloading multiple files over the distributed computing network. The GUI 150 may also allow the user to specify the type of file to be searched, such as text, audio, image, web page or video. The GUI 150 may further allow the user to input a plurality of search criteria, including, but not limited to the following:

a. Text File: The search query may contain one or more of a partial filename, keywords, author, file size, the category, and/or text description.

b. Audio File: The search query may contain a partial filename, a bitrate (bps), a sample rate (Hz) of the data, file size, content duration, the name of the author or artist, the song title, the genre, and/or the title of the file.

c. Video or Image File: The search query may contain a partial filename, the amount and type of compression, the size of the file, the category, and/or the description of the image or video.

d. Web page: The search query may contain words contained in the web page to be returned as a search result.

Figure 2:
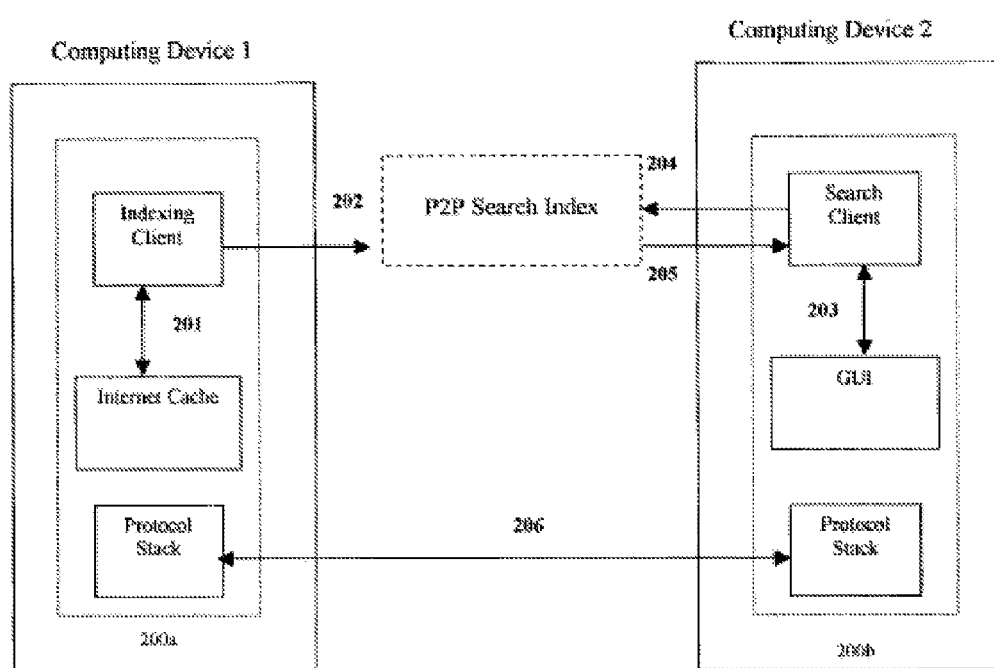
FIG. 2 depicts the overall operation of the search system of one embodiment of the present invention.

Referring now to FIG. 2, the operational flow of the search system of the present invention is described. A user operates a computing device, Computing Device 1, that is in data communication with a distributed network. The user accesses public or private networks using the computing device and, through its browser, operating system or other means, stores data in special network data folders, typically referred to as an Internet Cache. To enable the creation of a comprehensive index of data available on a network, the indexing client in Computing Device 1 creates an index of all the objects in the uploader's Internet Cache folder 201 and returns 202 the indexing information to a search index which can be locally stored or stored on a regional node. The objects that can be indexed and shared include, but are not limited to, web pages, images, video, audio, media, emails, text documents, data, applets, programs, parts of programs, and objects containing other objects such as emails containing attachments. These objects may be indexed by name of the object, relationships with other objects, subject matter, or data, keywords, images, image characteristics, such as type of image, subject matter, color, size, owner, industry, and date, owner of the data, hash of the object, including a hash of the entire object, a portion of the object, and a truncated hash thereof, and any other measurement characteristic that is intrinsic to, or can be assigned to, the object.

The indexing information preferably comprises links to the original source of the objects. A link is generally referred to as any association that would permit a user to identify the location, address or originator of the original source of the objects. The link is preferably determined from link information that is included in, or associated with, the cached or downloaded object. The link information is preferably generated at the time the object was accessed and/or downloaded by the user. In one embodiment, the link information comprises Universal Resource Locators (URLs). In another embodiment, the link information comprises FTP address information. Thus, the indexing system returns the URLs, FTP address, or other type of network or source address of the respective web sites or network location from where the files were originally downloaded into the Internet Cache or download location of the user's computer or computing device. Optionally, the indexed keywords may be links representing the location of the files in the Internet cache folder.

When a user computer searches for information, the user enters 203 the search query using the GUI or browser. The search keywords entered by the user are submitted 204 by the search client in Computing Device 2 to the search index. The search index has an associated software application that searches the index for the links matching the search criteria and returns 205 the appropriate search response to the requesting search client. Since the search index is constructed by searching the cached files on computers participating in the distributed network, one can avoid the need for central servers that have to handle heavy search request traffic.

The search response generated by searching the search index contains a list of files as well as links to the sources of files, which may be web sites or content providing computers participating in the distributed computing network. Thus, the user is able to search and access files on the peer-to-peer network as well as on the web by means of a single, unified interface.

In order to download a file from the list of available files as given in search results, the user may click on the related URL if the source of the file is a web site, or the user may download the file from of a peer computer which has that file located on its hard drive and is sharing it over the distributed computing network.

Referring again to FIG. 2, to download a file from a peer computer, the peer-to-peer ("P2P") protocol stack in Computing Device 2 communicates with the P2P protocol stack of Computing Device 1 having the requested file. It establishes a connection, as shown in step 206, and downloads the file to the user's computer. In a typical embodiment of a P2P file sharing, files downloaded by the search client from providers are immediately added to the shared file collection of the user, thereby making these files instantly available to other users on the network.

Since the system of present invention allows individual users to share out their cached files and these files are available for search by other users on the distributed computing network, this provides the individual user with a unique Personal Web Server capability. If a user participating in the distributed computing network wishes to host a web site, then the user does not have rely on third party search engines to drive traffic to its site because its site is automatically indexed and becomes part of the distributed search system.

For Personal Web Server applications, the distributed search system also makes website reference possible by a keyword just as easily as by URL, that is, the requirement of having a fixed URL becomes less important. For example, instead of www. bobs-site.com requiring a lookup on a DNS database to determine where to find the site, the site could also be found using the keywords "Bobs-Site" which would yield the site contents from any peers who are sharing it. The site becomes decentralized and therefore is not location-based. Specifically, an index associates www.bobs-site.com with a specific data file located on a central hosting server and on a plurality of user computing devices that have visited the site and therefore have the web page www. bobs-site.com indexed. When the search result is returned, a user can therefore access www. bobs-site.com by going to the central hosting server or having a cached version of that page delivered from the user-computing device.

The system of present invention enables the contents of a Personal Web Server to be sourced from various participating computers across the distributed network instead of, or in addition to, the content-originating server. This makes it possible to run even fairly large traffic sites over home ADSL connections because only a fraction of the download requests ever reach the origin server. The majority of download requests are fulfilled by other peers on the distributed computing network who have previously visited the site. In fact, for more popular sites, it is more likely that peers would be sharing out the pages, thereby facilitating substantial bandwidth reduction for the web site.

In another preferred embodiment of the present invention, the system provides the ability to group files together by source, that is, all the files that have been downloaded from the same web site by different users on the distributed computing network are grouped together. This can be used to create a cross-index that allows a user to find similar files from the same source. Thus, a user can perform searches akin to those such as "find more images like this". By way of example, but not limited to such example, if a user downloads an image from a web site about stamps, chances are that most other similar-sized images on the same page will be on the same theme—in this case stamps. If the user finds a single stamp image, he or she could request the search engine to find "more images like this". Because of the cross-index that has been built up between other images from the same site, the search engine would be able to provide the user with direct links to other stamp images from the same site, without requiring the user to necessarily visit that site.

The system of present invention provides access to unrestricted sources of content and, if desired, closed or restricted access as well. This is done by requiring a user to present valid credentials before index information of another peer on the distributed computing network is divulged. An exemplary application of this restricted access feature occurs when users attempt to access records of patient information distributed amongst various peer computers in the network. In this case, the index built up by each user of the system is based on records that they have downloaded and accessed from multiple sources.

Furthermore, the present invention ensures privacy of user's confidential information by not allowing such information to be indexed and thereby become a part of the global distributed index. For this purpose, the system of present invention includes programs to remove personally identifiable information from pages before including them in the index. For instance, if a user has accessed a web page, which contains a purchase receipt, it is likely that the page will also contain the user's name and credit card details. This information might be stored in cookies in the user's Internet cache folder and should obviously not be made public. Although indexing these details will not actually divulge any personal information other than the fact that the user has visited the particular site, revealing this information would constitute a breach of the user's privacy. Therefore, the system allows the users to enter their name, address and other keywords that should not be indexed, and ensures that these text strings are ignored when objects are indexed.

The invention also makes use of other methods, including heuristic analyses or neural networks, to avoid indexing personal information, including using knowledge that certain content types may be more likely to contain personally identifying information. For instance, the present invention can optionally not index, or more rigorously analyze, dynamically-generated web pages (i.e. web pages created on-the-fly tailored for that particular user) because dynamically-generated web pages are more likely to contain personally identifying information. The present invention can also optionally not index any page, or portions of a page, containing number strings that are structurally similar to, or contain numbers similar to, credit card, debit card, bank account, brokerage account, or other such information.

Figure 3:
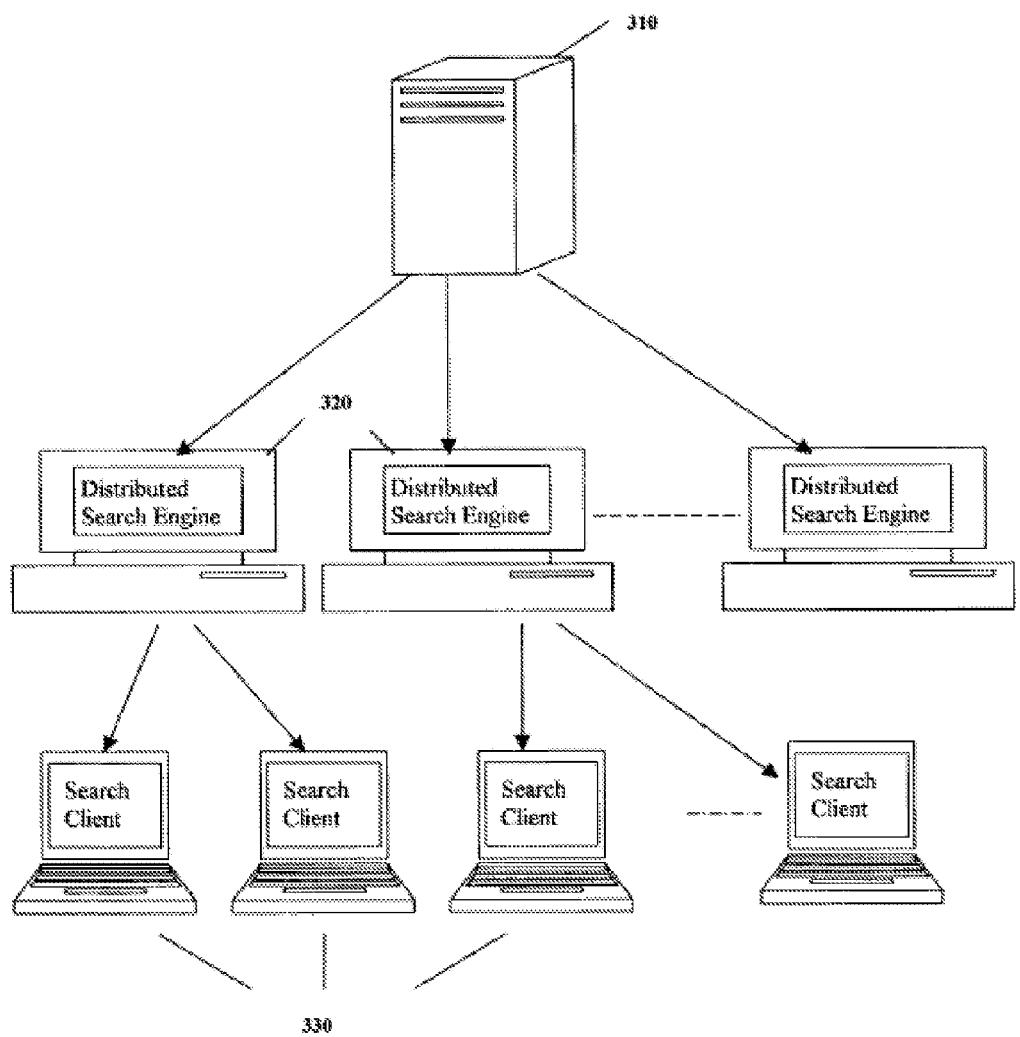
FIG. 3 is a diagram depicting a distributed search system according to another embodiment of the present invention.

In yet another preferred embodiment, the search system of the present invention addresses certain problems associated with existing central server based search systems, as currently used by commercial Internet search engines, and distributed networks by enabling a novel hybrid approach of the two. Referring now to FIG. 3, the system consists of a central server 310, a plurality of first clients 320 and a plurality of second clients 330, connected to a distributed computing network. The present system enables the integrated search of data relying on both conventional central server search techniques and distributed network search techniques. The integrated search is preferably accessed through a single search interface into which search queries are inputted by users.

Central server 310 maintains a downloadable data index, which is periodically updated. The downloadable data index is generated through the conventional spidering and indexing of web sites, as is well known to persons of ordinary skill in the art, the conventional indexing and sharing of files in distributed networks, as is well known to persons of ordinary skill in the art, and the reliance on distributed networks to generate indexes in accordance with the novel methods described herein. Consequently, the downloadable data index represents a comprehensive catalog of web sites, files, images, text, html, xml, video, audio, media, objects, and other data correlated with a plurality of search terms. Due to its size, it is preferably compressed.

The data index is distributed to the plurality of first clients 320, that participates in the distributed search system and forms a fraction (upwards of several thousand) of the total number of clients in the network, which may run into millions. First clients 320 maintain a local copy of the data index and periodically download updates to the data index from central server 310, to ensure that the data index is never more than a predesignated amount of time out of date, such as 30 minutes, 1 hour, 12 hours, or 24 hours. Each of the first clients 320 runs a distributed search engine application, which in a preferred embodiment is a software plug-in that receives search requests from a plurality of second clients 330 in the network, and fulfills those requests by searching the locally stored copy of the content database within the plurality of first clients 320.

All computers participating in the network, including the first clients 320, run a search client application, which in the preferred embodiment is a software plug-in module that receives search requests from the users, sends those requests to distributed search engine application in any of the first clients 320, and then returns search results to the requesting clients for display. All users in the distributed computing network also have data access control software, which is used to manage the uploading and downloading of files amongst distributed computers in the network.

Figure 4:
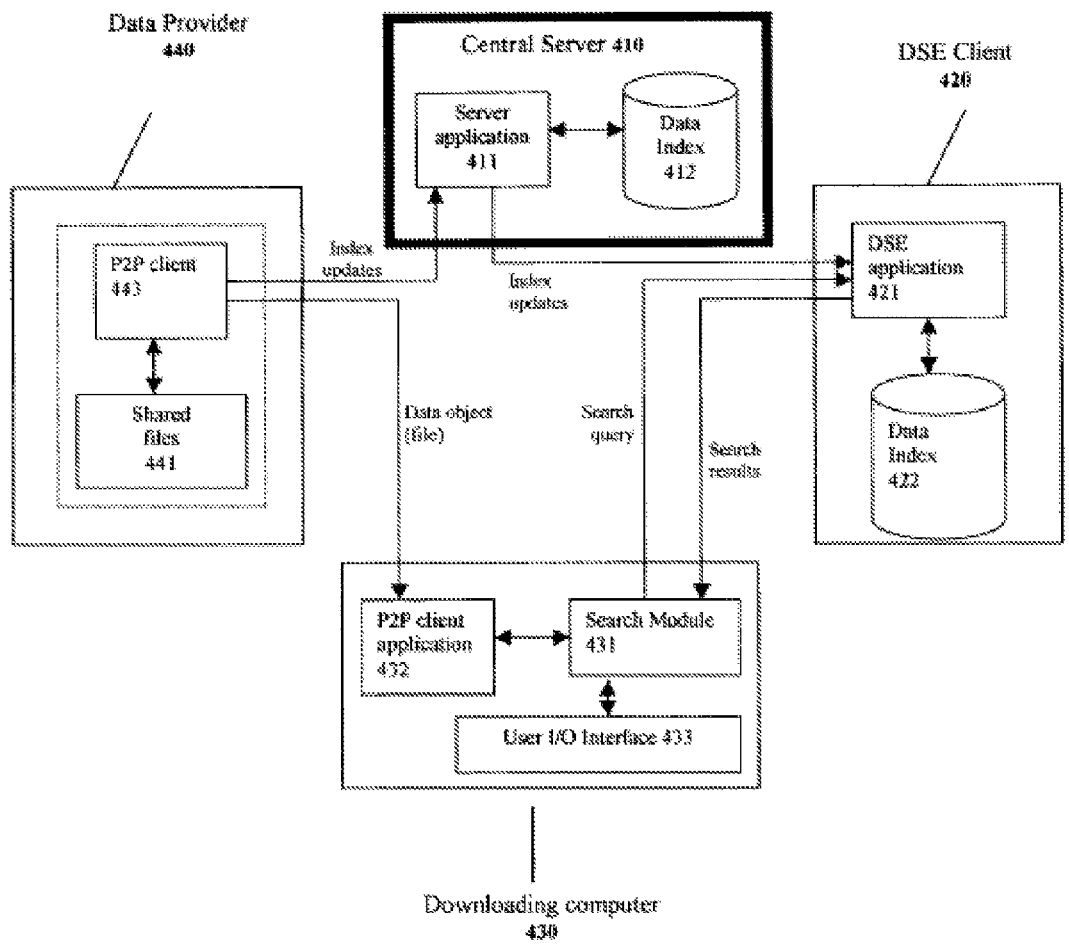
FIG. 4 is diagram depicting the relationship between different components of one embodiment of the distributed search system.

FIG. 4 is a block diagram illustrating the relationship between various components of the system described in FIG. 3. Referring now to FIG. 4 (and referring back to FIG. 3), each user computer contains the search module 431, which receives search queries from user and displays the search results, by means of an I/O interface 433. The I/O interface typically comprises a keyboard and a monitor. The search module 431 further communicates with a one or more available distributed search engines (DSE) participating in the distributed computing network. In a preferred embodiment, the DSE application is run on high-end personal computers with a high bandwidth Internet connection.

Each client 420 running the DSE is equipped with a copy of data index 422, stored preferably in a local storage medium, such as a hard disk. In another preferred embodiment, data index 422 is stored in a remote location, still accessible by DSE client 420. In another embodiment, the present invention enables users to access content from multiple network sources using a single interface. Referring back to FIG. 1, the search application, described above, comprises a Graphical User Interface (GUI) 150 that receives content requests from users and is linked to a manager 120, which enables users to access content from multiple distributed computing networks via a search module 130. The search module 130 interfaces with the data index described above on either one of a central server or plurality of first clients. The GUI preferably comprises a download progress display that helps users keep track when downloading multiple media files from different sources.

In one embodiment, the manager 120 is a browser plug-in that enables users to download files from a plurality of networks, including central server and distributed networks. The manager 120 co-ordinates functions for downloading content, search on multiple networks, awarding points for buying content and for file and/or CPU time sharing, tracking of points accumulated by users and redemption of points for items of merchandise.

In another embodiment, the distributed search system and method comprises a central server to maintain a downloadable data index, a plurality of distributed search engine applications operable on a plurality of first clients, and a plurality of applications capable of receiving search queries from users of a peer to peer application operable on a plurality of second clients. The plurality of search receiving applications fulfill those requests by searching a copy of the data index which is either stored locally, on one of the first clients, on the central server, or in a plurality of locations which can be local and remote. In one embodiment, the search query receiving application sends requests to participating distributed search engine applications and then returns search results to the peer to peer application to display. In another embodiment, the search query receiving application sends requests to multiple participating distributed search engine applications having each application search a separate portion of the data index and then returns search results to the peer to peer application to display. When users of the peer to peer applications click to download the identified file, the application initiates the downloading of the selected file using the peer to peer application stack available on the user's computing device.

In operation, it is preferred that a) users with computing devices having high processing power and large bandwidth connections be encouraged, through some form of compensation, to act as first clients, b) the search receiving application maintains a local copy of the data index, and c) local copies of the data index are not more than 24 hours out of date.

All or some of the users participating in the distributed computing network may also act as data providers. An example of such data provider 440 is shown in FIG. 4. Data providers 440 contain a plurality of shared data 441, which can be uploaded to other clients in the P2P network, using P2P client application 443. P2P client application 443 further uploads index updates to the central server 410, in cases when, for example, new cached data 441 are created by the user's searching activities.

The Central server 410 typically contains server application 411, comprising a search index builder for creating description entries in index 412. Search index builders are well known in the art. Server application 411 receives index updates regarding available data from data providers 440 in the network, communicates the updates to index database 412, and periodically uploads the index updates to participating DSE clients 420.

Figure 5:
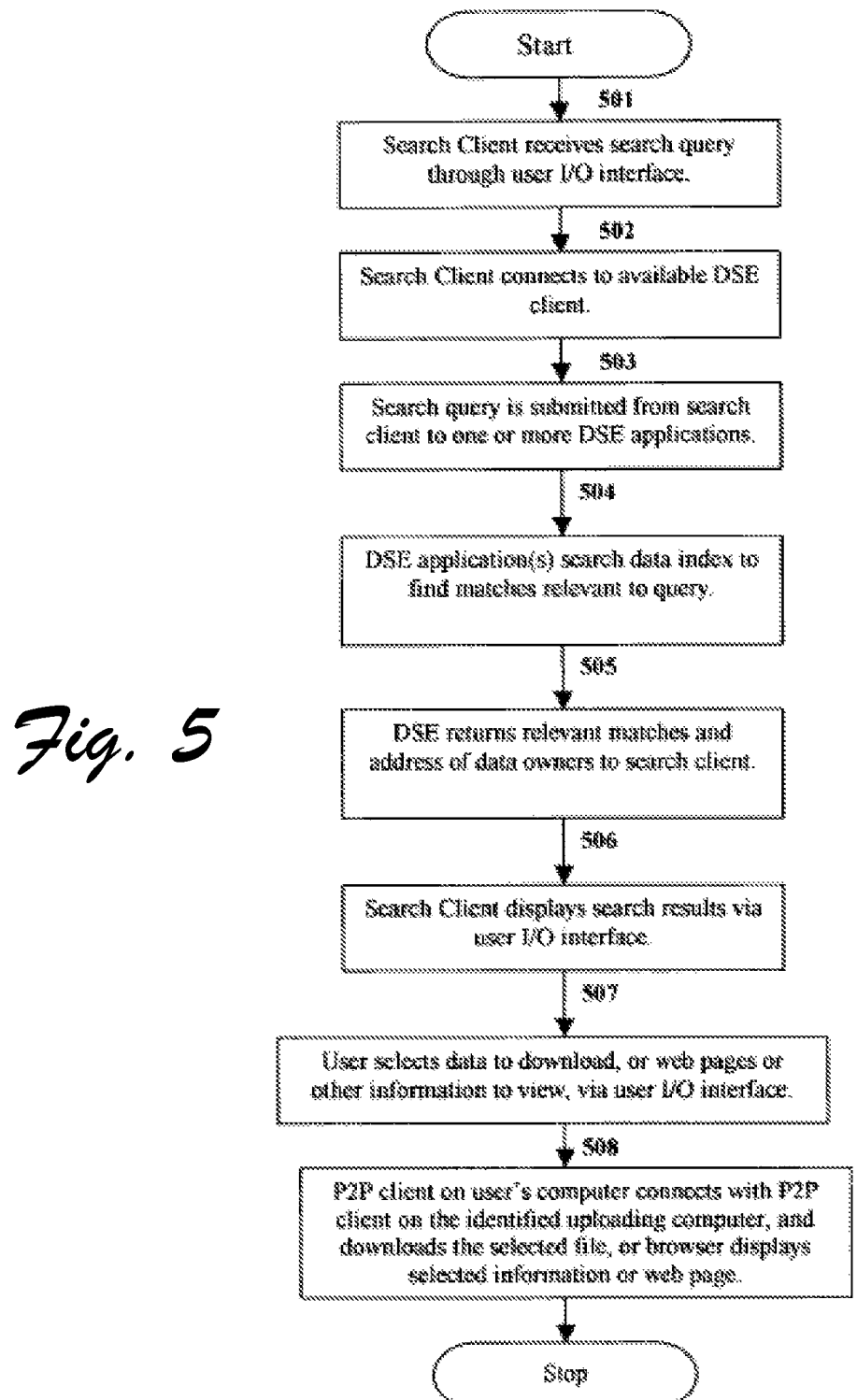
FIG. 5 is a flowchart illustrating the sequence of steps carried out in searching and downloading content by using the distributed search system.

FIG. 5 is a flow chart depicting the overall operation of the system of the present invention. Referring to FIG. 5, when a search is initiated at a search client station, the search client receives a search query from the user via a graphical user interface (GUI) as shown in step 501.

In one embodiment, when data is searched for in a P2P network, the search application allows the user to choose a plurality of search parameters to yield a search response that includes only links to data located on data providers that have a minimum data transfer bandwidth capability. In another embodiment of a P2P search, the application allows the user to choose a plurality of search parameters to return a search response containing only links to data located on data providers that are not currently too busy to accept additional download requests.

In step 502 the search client application connects to one or more available DSE clients in the network. In one preferred embodiment, the selected DSE uses less of its available bandwidth than other DSEs in the distributed computing network.

In step 503, the search client application submits the search request to the DSE client or clients. Each DSE application searches 504 a locally or remotely stored copy of the data index to find matches satisfying all or a plurality of the search criteria in the query.

The search response generated by each DSE contains a list of data and data provider descriptions, optionally including data names, descriptions, excerpts, subject matter, author, owner, address, indexing source, data provider identifier, IP address, data provider bandwidth (56k or cable modem, DSL, T1, etc), song title, artist title, file size, or file quality rating. A plurality of the fields in the data descriptions and data provider descriptions are then returned in the search response. In one embodiment, the DSE ranks the search response on the basis of relevance (such as in case of a text file), or quality rating/integrity (such as in case of an audio file).

Once a relevant set of results is identified, the DSE returns the search response to the search client in step 505. In step 506, the search client uses the GUI to display the search results to the user.

Once a user selects data for download in step 507, the P2P client on the user's computer connects with the P2P client of the uploading computer, web site or network device on which the selected data is stored. The data is downloaded using the uploader's P2P client or other data serving application in step 508.

The principles of the present invention, as described above, can be extended to incorporate search results from the web using the same user interface as provided by the search client. This is enabled by allowing the Central server to communicate with a plurality of Internet sites. Keywords from the data objects within the Internet sites can be indexed and stored locally in the Central Server. The keywords and their indices are locally updated and uploaded to Central Server and incorporated into data index. In another preferred embodiment, Central Server is in data communication with one or more commercial Internet search engine servers, which periodically upload updates for either a portion of or their entire data index to Central Server. In both cases, the DSE clients download the updates from Central Server into the local data index. The local data index in the DSE clients thus comprises updated data information from data owners within the P2P network, as well as Internet sites which are not connected to the P2P network, thereby allowing the users to search for content on the P2P network as well as from websites not a part of the P2P network, via a unified interface.

The search response from the DSE would accordingly contain descriptions of data from providers within, as well as outside, the distributed computing network. For content available outside the distributed computing network, the search response may include the URL of the data in place of the IP address of the provider. For a P2P shared file, the file is downloaded using the P2P client, as explained previously. For data available on the Internet, the search client connects with the URL of the desired file via the search client application, and subsequently downloads the file.

The DSE preferably runs on high-resource clients, in terms of CPU speed, memory and available bandwidth. In an optional feature of the present invention, users with high-end personal computers and fast Internet connections are encouraged to participate as DSE clients in the network and subsequently rewarded for doing so.

Figure 6:
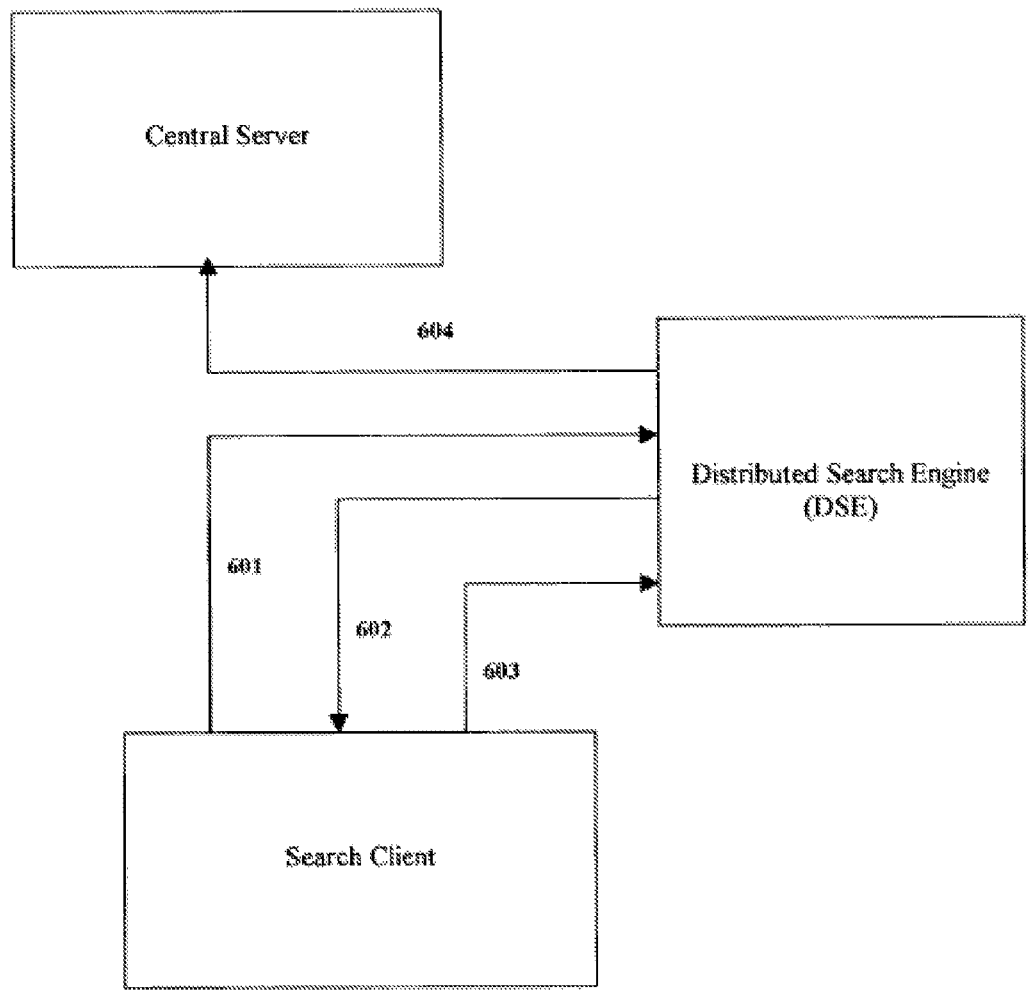
FIG. 6 is a diagram depicting a method for rewarding a user for participating in the distributed search according to one embodiment of the distributed search system.

FIG. 6 shows an optional embodiment of a system wherein a user is rewarded for participating in the search. Referring to FIG. 6, when a user initiates a search, the search client in the user's computer sends, in step 601, the search query to the Distributed Search Engine (DSE) of another user participating in the distributed computing network. In step 602, when the DSE client receives the search query, it searches for relevant matches in its local data index, and returns the search response to the search client. The search response also contains an invoice that is attached to it by the DSE. On receiving the search response with the invoice, the Search Client application provides a digital signature to the invoice using a private key, thereby forming a "signed receipt", and returns this signed receipt to the DSE client, as shown in step 603. The signed receipt is stored locally by the DSE client. These stored receipts can periodically communicated to the central server for reward recognition, as shown in step 604, which verifies the authenticity of the signed receipts and tags the valid receipts for reward eligibility.

A DSE client user may be rewarded in a number of ways. In a proposed embodiment, all validated signed receipts are credited to the user's account with a corresponding number of points. These points may be redeemed later in the form of, for example, higher download quality of content, free downloads, or any other acceptable form of reward. Optionally, the DSE client may have a software application called Points Manager (not shown) for the purpose of managing award and redemption of points.

The present instant invention has a clear advantage over the central-server type approach for search, since all the search queries are not directed toward a single central server, but are handled by various distributed search engines running over several client computers in the network. Hence, there is no need to invest in a heavy central server infrastructure that would be required to handle the huge traffic of incoming search requests, thus providing a significant reduction in cost.

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

We claim:

1. A distributed search system comprising:
    a central server having an index of data, wherein said index of data is also available on a plurality of computing devices in a distributed computing network, said plurality of computing devices being distinct from said central server, each said computing device having a cache in which said computing device automatically stores data generated during the course of said computing device's access to another computing network distinct from said distributed computing network;
    computer program code stored in a memory of at least one of said plurality of computing devices for periodically and automatically scanning said cache of said computing device, for automatically and periodically generating said index of data based on data in said cache folder, and for automatically and periodically transmitting said index of said data to said central server;

a plurality of first clients connected to said distributed computing network, wherein each of said first clients has access to a copy of said index of data; and a plurality of second clients connected to said distributed computing network, wherein one or more of said first clients receive a plurality of search requests from at least one of said second clients, and fulfill said requests by searching said copy of said index of data, wherein each of said plurality of first clients has a distributed search engine application for receiving and fulfilling search requests from said second clients, and wherein said distributed search engine application transmits an invoice with the search response to said requesting search client application.

2. The distributed search system of claim 1, wherein said index of data contains data information and data location information on a computing device in data communication with a distributed network.

3. The distributed search system of claim 1, wherein said index of data contains address information of said data wherein said address is of at least one computing device in data communication with a distributed network.

4. The distributed search system of claim 1 wherein said index of data contains address information of said data wherein said address is of at least one server host of a web site.

5. The distributed search system of claim 1 wherein said at least one of said first clients automatically and periodically download said index of data from said central server.

6. The distributed search system of claim 1, wherein each of said plurality of second clients has a search client application for receiving a search request from a computing device, sending said search request to at least one of said distributed search engine applications located on at least one first client, and receiving a search response from said distributed search engine application for display.

7. The distributed search system of claim 6, wherein the search client application, upon receiving the search response, digitally authenticates the invoice and returns an authenticated receipt to said distributed search engine application.

8. The distributed search system of claim 7, wherein said distributed search engine application collects authenticated receipts and periodically transmits at least a portion of said receipts to the central server.

9. The distributed search system of claim 1 wherein said distributed computing network is a peer-to-peer network.

10. A distributed search system comprising:

a central server having an index of data, wherein said index of data is also available on a plurality of computing devices in a distributed computing network, said plurality of computing devices being distinct from said central server, each said computing device having a cache in which said computing device automatically stores data generated during the course of said computing device's access to another computing network distinct from said distributed computing network;

computer program code stored in a memory of at least one of said plurality of computing devices for periodically and automatically scanning said cache of said computing device, for automatically and periodically generating said index of data based on data in said cache folder, and for automatically and periodically transmitting said index of said data to said central server;

a plurality of first clients connected to said distributed computing network, wherein each of said first clients has access to a copy of said index of data; and a plurality of second clients connected to said distributed computing network, wherein one or more of said first clients receive a plurality of search requests from at least one of said second clients, and fulfill said requests by searching said copy of said index of data, wherein each of said plurality of first clients has a distributed search engine application for receiving and fulfilling search requests from said second clients, and wherein said distributed search engine application transmits an invoice with the search response to said requesting search client application, and wherein the search client application, upon receiving the search response, digitally authenticates the invoice and returns an authenticated receipt to said distributed search engine application, and wherein said distributed search engine application collects authenticated receipts and periodically transmits at least a portion of said receipts to the central server.

11. The distributed search system of claim 10, wherein said index of data contains data information and data location information on a computing device in data communication with a distributed network.

12. The distributed search system of claim 10, wherein said index of data contains address information of said data wherein said address is of at least one computing device in data communication with a distributed network.

13. The distributed search system of claim 10 wherein said index of data contains address information of said data wherein said address is of at least one server host of a web site.

14. The distributed search system of claim 10 wherein said at least one of said first clients automatically and periodically download said index of data from said central server.

15. The distributed search system of claim 14, wherein each of said plurality of second clients has a search client application for receiving a search request from a computing device, sending said search request to at least one of said distributed search engine applications located on at least one first client, and receiving a search response from said distributed search engine application for display.

16. The distributed search system of claim 10 wherein said distributed computing network is a peer-to-peer network.

17. A method, in distributed search system comprising:

(a) a central server having an index of data, wherein said index of data is also available on a plurality of computing devices in a distributed computing network, said plurality of computing devices being distinct from said central server, each said computing device having a cache in which said computing device automatically stores data generated during the course of said computing device's access to another computing network distinct from said distributed computing network; and (b) computer program code stored in a memory of at least one of said plurality of computing devices for periodically and automatically scanning said cache of said computing device, for automatically and periodically generating said index of data based on data in said cache folder, and for automatically and periodically transmitting said index of said data to said central server;

(c) a plurality of first clients connected to said distributed computing network, wherein each of said first clients has access to a copy of said index of data; and (d) a plurality of second clients connected to said distributed computing network, wherein one or more of said first clients receive a plurality of search requests from at least one of said second clients, and fulfill said requests by searching said copy of said index of data, wherein each of said plurality of first clients has a distributed search engine application for receiving and fulfilling search requests from said second clients, the method comprising:

(A) said distributed search engine application transmitting an invoice with the search response to said requesting search client application, wherein the search client application, upon receiving the search response, digitally authenticates the invoice and returns an authenticated receipt to said distributed search engine application, and (B) said distributed search engine application collecting authenticated receipts and periodically transmitting at least a portion of said receipts to the central server.

18. The method of claim 17, wherein the search client application, upon receiving the search response, digitally authenticates the invoice and returns an authenticated receipt to said distributed search engine application.

19. The method of claim 17 further comprising:

(C) said distributed search engine application collecting authenticated receipts and periodically transmitting at least a portion of said receipts to the central server.

20. The distributed search system of claim 17 wherein said distributed computing network is a peer-to-peer network.

* * * * *